United States Patent
Cricco et al.

(10) Patent No.: US 7,657,257 B2
(45) Date of Patent: Feb. 2, 2010

(54) LOADING AN APPLICATION TO BE DEPLOYED IN A TERMINAL AND A CHIP CARD

(75) Inventors: Remy Cricco, Marseilles (FR); Christophe Guillaud, Marseilles (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 10/534,880

(22) PCT Filed: Nov. 13, 2003

(86) PCT No.: PCT/FR03/50120

§ 371 (c)(1), (2), (4) Date: Jun. 16, 2005

(87) PCT Pub. No.: WO2004/047473

PCT Pub. Date: Jun. 3, 2004

(65) Prior Publication Data

US 2006/0020659 A1  Jan. 26, 2006

(30) Foreign Application Priority Data

Nov. 14, 2002 (FR) .................................. 02 14276

(51) Int. Cl.
G06F 15/16 (2006.01)
(52) U.S. Cl. ....................... 455/419; 709/203; 455/558
(58) Field of Classification Search ................. 455/419, 455/466, 558, 966; 370/335; 379/114.03; 235/492; 700/17; 709/203; 717/168, 171
See application file for complete search history.

(56) References Cited

U.S. PATENT DOCUMENTS 6,023,620 A  2/2000  Hansson
6,571,112 B1 *  5/2003  Ramaswamy ............... 455/466

(Continued)

FOREIGN PATENT DOCUMENTS

FR  2 805 912  9/2001

OTHER PUBLICATIONS

Z. Steve Jin et al., "*Java Tip 120: Execute Self-Extracting JARS (Create Easy-to-Use, Cross-Platform Java Archives)*", Java World, 'Online', URL:http://www.javaworld.com/javatis/jw-javatip120_p.html, Nov. 16, 2001, pp. 1-4, XP-002245316 (cited in the International Search Report).

(Continued)

*Primary Examiner*—Nick Corsaro
*Assistant Examiner*—Michael T Vu
(74) *Attorney, Agent, or Firm*—Buchanan Ingersoll & Rooney PC

(57) ABSTRACT

In order to rapidly load from a server (1) an application to be deployed (AP) in a terminal (2) and a chip card (3), a message (MAP) containing both a first application part and second application part formatted so as to be compatible with a protocol for communication between the terminal and the card is transmitted by the server to the terminal, which stores the two parts. The first part (APT) extracted from the application message (MAP) is installed in the terminal. A specific loader (CAPC) loads the second part (APC) extracted from the message according to the communication protocol. The installations of the two application parts are thus synchronous under the control of the terminal.

10 Claims, 4 Drawing Sheets

U.S. PATENT DOCUMENTS

| | | | |
|---|---|---|---|
| 6,880,761 B1 * | 4/2005 | Ritter et al. | 235/492 |
| 2002/0056079 A1 * | 5/2002 | Sato et al. | 717/168 |
| 2002/0116513 A1 | 8/2002 | Heinonen | |
| 2003/0032417 A1 * | 2/2003 | Minear et al. | 455/419 |
| 2003/0040811 A1 * | 2/2003 | Lim et al. | 700/17 |
| 2004/0032936 A1 * | 2/2004 | Horel et al. | 379/114.03 |
| 2004/0076131 A1 * | 4/2004 | Qu et al. | 370/335 |

OTHER PUBLICATIONS

Ramon Casha, "*Self-Extracting Archive Howto*", Malta Linux User Group, 'Online', URL:http://linux.org.mt/article/selfextract, Mar. 15, 2002, pp. 1-4, XP-002245317 (cited in the International Search Report).

* cited by examiner

LOADING AN APPLICATION TO BE DEPLOYED IN A TERMINAL AND A CHIP CARD

This disclosure is based on upon French Patent Application No. 02 14276, filed Nov. 14, 2002, and International Application No. PCT/FR2003/050120, filed Nov. 13, 2003, the contents of which are incorporated herein by reference.

BACKGROUND OF THE INVENTION

The present invention concerns the loading of an application to be deployed, also referred to as an application to be distributed, in a terminal and a chip card, also referred to as a microcontroller card or integrated-circuit card.

The terminal accepts the chip card and can, according to a preferred example, be a mobile radiotelephone terminal for which the chip card is a removable user identity module SIM (Subscriber Identity Module), to which reference will be made later in the description. In other examples, the terminal can be a bank terminal accepting a debit or credit card, or a personal computer (PC) provided with a chip card reader, or small communicating equipment such as a personal digital assistant (PDA) able to read a chip card introduced into it.

The invention thus concerns in general terms an open terminal in which there is implemented an open operating system which allows dynamic downloading of additional applications "on top of" the operating system partially in a chip card accepted in the terminal.

Referring to FIG. 1, this depicts the main entities for downloading an application composed of a first part PA1 and a second part PA2 from an OTA (Over The Air) platform such as an application server SAP to a mobile radiotelephone TE containing a removable chip card CP of the SIM card type. The terminal TE and the chip card CP each contain an interpreter of the Java or Microsoft (registered trade marks) virtual machine type. In particular, the terminal includes a card manager G for managing the data exchanges between the world external to the terminal TE and the chip card CP.

The application server SAP is managed for example by an application provider for mobile terminals and operates in the following manner in order to download an application composed of the parts PA1 and PA2.

The first part PA1, intended to be loaded into the terminal TE, is downloaded through a network of packets of the Internet type RP, a switched telephone network RTC and the radiotelephone network RR to which the terminal TE belongs. The downloading of the first application part PA1 is carried out at a higher rate, typically 9600 bits/second, in particular through a traffic channel of the radiotelephone network RR. The part PA 1 is installed and managed by an application manager G implemented in the terminal.

The second application part PA2, intended for the chip card CP, can be downloaded only be means of short messages MC whose transmission rate is low, a few hundred of bits per second, and therefore very much less than the rate for downloading the first application part PA1. Thus the second application part PA2 passes through the packet network RP, a short message server SMC generally generating several short messages MC segmenting the application part PA2 transmitted directly or through an intermediate network RI of the ISDN or X.25 type to the radiotelephone network RR, and then through the terminal TE, which is transparent to the application part PA2.

The separation of the application into two parts PA1 and PA2 through the different transmission parts RP-RTC-RR and RP-SMC-RI-RR naturally gives rise to a desynchronisation of the application parts actually downloaded separately into the terminal TE and the chip card CP. Since the downloadings are performed separately, the terminal TE and the chip card CP acknowledge reception of the downloading of the parts PA1 and PA2 to the server SAP separately rather than simultaneously before commencing any execution of the application [PA1, PA2] in the terminal TE and chip card CP assembly. In particular, the application manager G must wait until the second application part PA2 is completely downloaded into the card CP at the said low rate in order to decide on execution of the application.

SUMMARY OF THE INVENTION

The main objective of the invention is to remedy the drawbacks due to the desynchronisation of the downloading of the two application parts according to the prior art. It aims more particular to provide a synchronisation mechanism for the terminals so that it itself loads the second part of the distributed application whilst having rapidly received the two parts of the application at an appreciably higher rate than that offered by a short-message transmission. If necessary the terminal transmits only one acknowledgement message after the installation of the application in the terminal and chip card.

In order to achieve this objective, a method for loading from a server an application including a first part intended for a terminal provided with an application management means and a second part intended for a chip card accepted in the terminal, is characterised in that it comprises the steps of:

supplying to the terminal a loading means for loading the second application part in the chip card, formatting in the server the second application part so that it is compatible with a protocol for communication between the terminal and the chip card, constructing in the server an application message containing the first application part and the second formatted application part, transmitting the application message from the server to the terminals over a single transmission channel, installing in the terminal the first application part extracted from the application message via the management means, and loading the second application part extracted from the application message from the terminal into the chip card according to the predetermined communication protocol under the control of the loading means.

The invention thus dispenses with the problem of desynchronisation of the loadings of the first and second parts of the application since both are installed respectively in the terminal and chip card under the control of the application management means and of the loading means implemented in the terminal. No additional means for managing the simultaneous transmission of the two application parts in an common application message is necessary in the server. A single acknowledgement can be transmitted by the terminal to the server in order to indicate the availability of the application installed in the terminal for being executed.

The management means analyses a descriptor of the application which has at least one identifier of the second formatted application part and which is contained in the application message constructed in the server. The management means then analyses the descriptor in the application message received by the terminal so that the second application part is extracted from the application message according to the identifier in the descriptor analysed. The charging means is then activated by the management means in order to load the second application part in the card. The terminal thus itself manages the loading of the second application part in the card in synchronism with the installation of the first application part in the terminal.

The downloading of the application to the terminal uses according to the invention an existing transmission path whatever the type of terminal, which may be a mobile radiotelephone terminal, a personal computer, etc. In particular, when the terminal is a mobile radiotelephone terminal, any application is transmitted over a traffic channel on the radio interface between the terminal and a base station of the radiotelephony network, that is to say at an appreciably higher rate than by means of short messages according to the prior art.

BRIEF DESCRIPTION OF THE DRAWINGS

Other characteristics and advantages of the present invention will emerge more clearly from a reading of the following description of several preferred embodiments of the invention with reference to the corresponding accompanying drawings, in which:

FIG. 1 is a schematic block diagram between an application server and a terminal with a chip card according to the prior art already commented on;

DETAILED DESCRIPTION

The preferred embodiment of the invention described below with reference to FIG. 3 concerns by way of example the loading of an application from an application server 1 into a terminal 2 of the mobile radiotelephone terminal type provided with a chip card 3.

Figure 2:
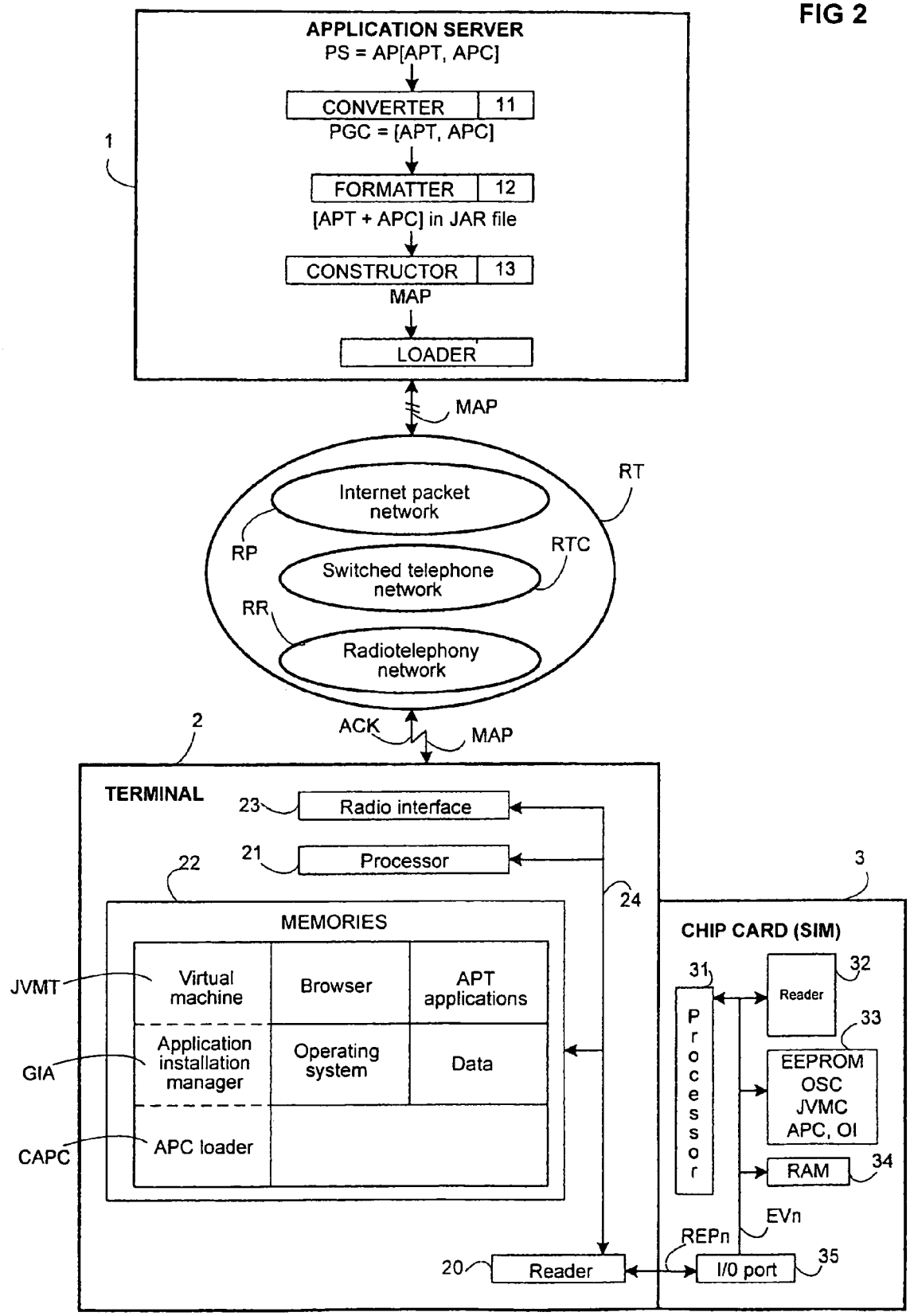
FIG. 2 is a schematic block diagram of a telecommunications system between an application server and a terminal with a chip card according to the preferred embodiment of the invention in which the terminal is a mobile radiotelephone terminal.

In the three entities 1, 2 and 3, there are depicted in FIG. 2 functional blocks providing functions having a connection with the invention and able to correspond to software and/or hardware modules.

The terminal 2 is included in a digital cellular radiotelephone network RR, for example of the GSM or UMTS type. More precisely, the terminal 2 is connected to the server 1 through a telecommunications network comprising conventionally a packet network RP such as the Internet, a switched telephone network RTC and the radiotelephony network RR. The chip card 3 constitutes an identity module removable from the terminal 2, known by the term "SIMcard" (Subscriber Identity Module). In a variant, the chip card 3 may be a chip card additional to the SIMcard.

According to other variants, the terminal may be a personal electronic computer (PC), or a bank terminal or a point of sale terminal or a personal digital assistant (PDA), or a portable message transmission device, etc. In association with these various types of terminal, the chip card 3 may be a portable electronic object such as a debit or credit card, an electronic purse, an additional chip card or any other small or miniature electronic device.

In general, the terminal 2 contains, as a peripheral, a reader 20 in which the chip card 3, with or without electrical contact, is inserted at least partially.

The application server 1 constitutes an internet site belonging for example to the chip card editor 3 or to an editor which edits the applications to be downloaded into chip cards.

A source program PS corresponding to an application AP, a first part APT of which, which may be empty, is to be downloaded into the terminal 2, and a second part APC of which is to be downloaded into the chip card 3, was written initially in a high-level language of the object oriented type such as Java. As will be seen hereinafter, the terminal 2 and the chip card 3 contain respectively virtual execution means such as a Java (registered trade mark) virtual machine JVMT for executing the application part APT and a Java card (registered trade mark) virtual machine JVMC for executing the application part APC. In a known manner, the source program PS is converted in a converter 11 of the server 1 into an intermediate language, also referred to as pseudo-code, composed of instruction words formed by bytes referred to as bytecodes, which are ready to be executed by the virtual machines JVMT and JVMC implemented in the terminal 2 and chip card 3. The compiled program PGC produced by the converter 11 contains the first compiled application part APT and the second compiled application part APC, which correspond to those contained in the source program PS and supplied by a developer of the application editor.

In a variant, the converter 11 is implemented outside the server 1.

Each application part APT (.class) and a APC (.cap) contains a set of components constituting files which can each correspond to an object class, a method, a directory, a header, a descriptor, etc.

Figure 3:
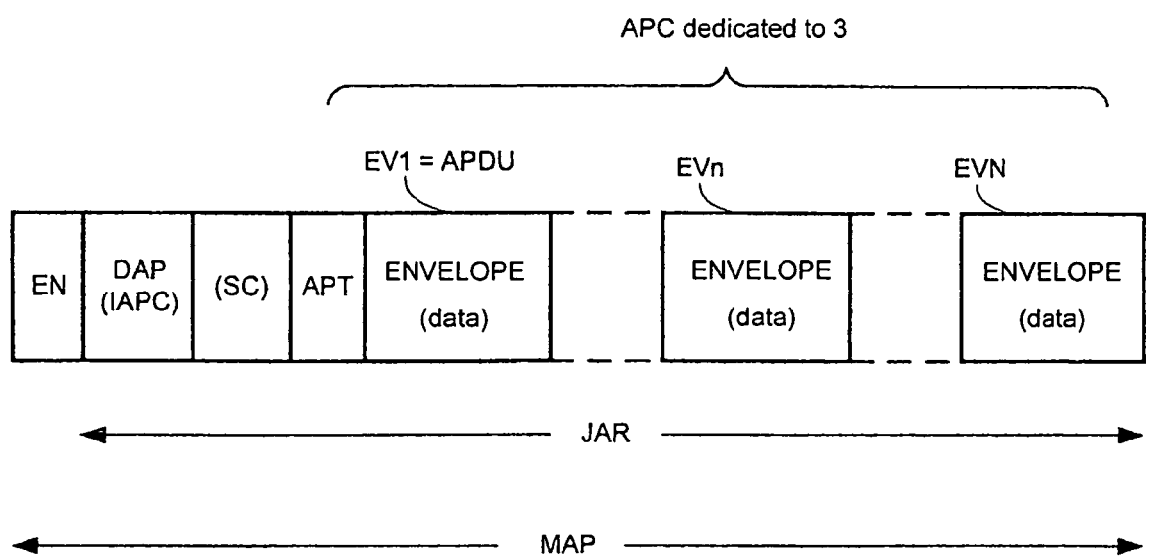
FIG. 3 is a graph showing the composition of an application message transmitted by the server to the terminal, according to the invention.

In particular, as shown in FIG. 3, the second application part APC dedicated to the chip card 3 is segmented into commands EV1 to EVN of the "ENVELOPE" type, which are concatenated and which contain data relating to the second application part APC and can be loaded directly into the chip card 3. The commands EV1 to EVN are compatible with a protocol for communication between the terminal 2 and the chip card 3, typically an either-way asynchronous protocol, and are able to transfer the data from the second application part APC of the terminal 2 to the chip card 3 without the terminal 2 interpreting them. The data in the commands EV1 to EVN can therefore be interpreted directly by the virtual machine JVMC implemented in the chip card 3, in a similar manner to a short message received by a terminal according to the prior art and transmitting a command "ENVELOPE (SMS-PP DOWNLOAD)" directly to the chip card 3.

In the server 1, a formatter 12 formats the second application part APC in a succession of "ENVELOPE" commands EV1 to EVN.

The application server 1 also comprises an application message constructor 13 and a loader 14. The constructor 13 constructs an application message MAP as shown in FIG. 3. The message MAP comprises a header EN, an application descriptor DAP, the first application part APT and the second application part APC with the concatenated commands EV1 to EVN. The descriptor DAP contains in particular an identifier IAPC indicating the position of the start of the second application part APC in the message data field MAP following on from the descriptor DAP. The identifier IAPC will serve to extract the second application part APC from the message MAP stored in the terminal 2. The descriptor DAP constitutes a JAD (Java Application Descriptor) file and the set of data [DAP(IAPC), APT, APC] constitutes a JAR (Java Application Repository) file according to the description of the Java card virtual machine. The message MAP thus produced by the constructor 13 thus contains an applet to be transmitted to the terminal 2 under the control of the loader 14 over the telecommunications network RT. The loader 14 adapts the message MAP to the transport protocols such as HTTP (Hypertext Transfer Protocol) and network protocol (Internet Protocol) of the packet network RP to which the server 1 is connected.

The terminal 2, of the mobile radiotelephone type, comprises conventionally, apart from the chip card reader 20, a processor 21, memories 22 and a radio interface 23 connected by a bus 24. The memories 22 group together various memories such a read only memory, a EEPROM non-volatile memory and a RAM memory. When the terminal is for example a personal computer, the memories 22 comprise a hard disk. Naturally the terminal 2 comprises other peripherals at the man-machine interface with the processor 22 such as a keypad, a graphic display, at least one known speaker, a microphone, etc. The interface 23 transposes in frequency, converts digitally, demodulates and decodes messages received via the fixed network in the network RR.

The memories 22 in the terminal 2 contain in particular an operating system, the Java virtual machine JVMT, a browser, and various data applications.

In particular, in the non-volatile memory of the memories 22 of the terminal 2, an application installation manager GIA programmed in Java language and executable in the terminal 2 is implemented. The manager GIA serves to install various applications in the memories 22 of the terminal 2 and to launch their executions, and in particular to install and launch the first part APT of a deployed application AP according to the invention. The manager GIA can be included in the virtual machine JVMT.

The manager GIA distinguishes, in a received application message MAP, the first application part APT intended for the terminal 2 with respect to the second application part APC intended for the chip card 3 without requiring an interpretation of the data contained in the commands EV1 to EVN by the virtual machine JVMT.

In connection with the manager GIA, a loader CAPC for loading the second application part APC from the terminal into the chip card is implemented, according to the invention, also in the form of a software module in the memories 22 of the terminal 2. The loader CAPC creates a link between the virtual machine JVMT and the manager GIA implemented in the terminal 2 and the virtual machine JVMC and an application installation tool OI implemented in the chip card 3 through the predetermined communication protocol having protocol data units (PDU) consisting of the commands EV1 to EVN and their responses RES1 to RESN exchanged between the terminal 2 and the chip card 3.

The chip card 3, which is a removable SIM card according to the preferred embodiment, comprises conventionally, in integrated form, a microprocessor 31, a non-rewritable memory 32 of the ROM type, a non-volatile memory 33 of the EEPROM type and a memory 34 of the RAM type intended essentially to exchange data with the terminal 2 through in an input/output port 35. The memories 32 and 33 contain the codes and data of an operating system OSC and of the virtual machine JVMC according to the Java card specification. The non-volatile memory 33 contains various applications and is intended to receive the second application part APC contained in an application message MAP transmitted by the server 1 through the terminal 2 and downloaded by the reader 20 through the port 35 and RAM memory 34. The memory 33 also contains the installation tool OI for installing second application part APC according to the invention.

Figure 4:
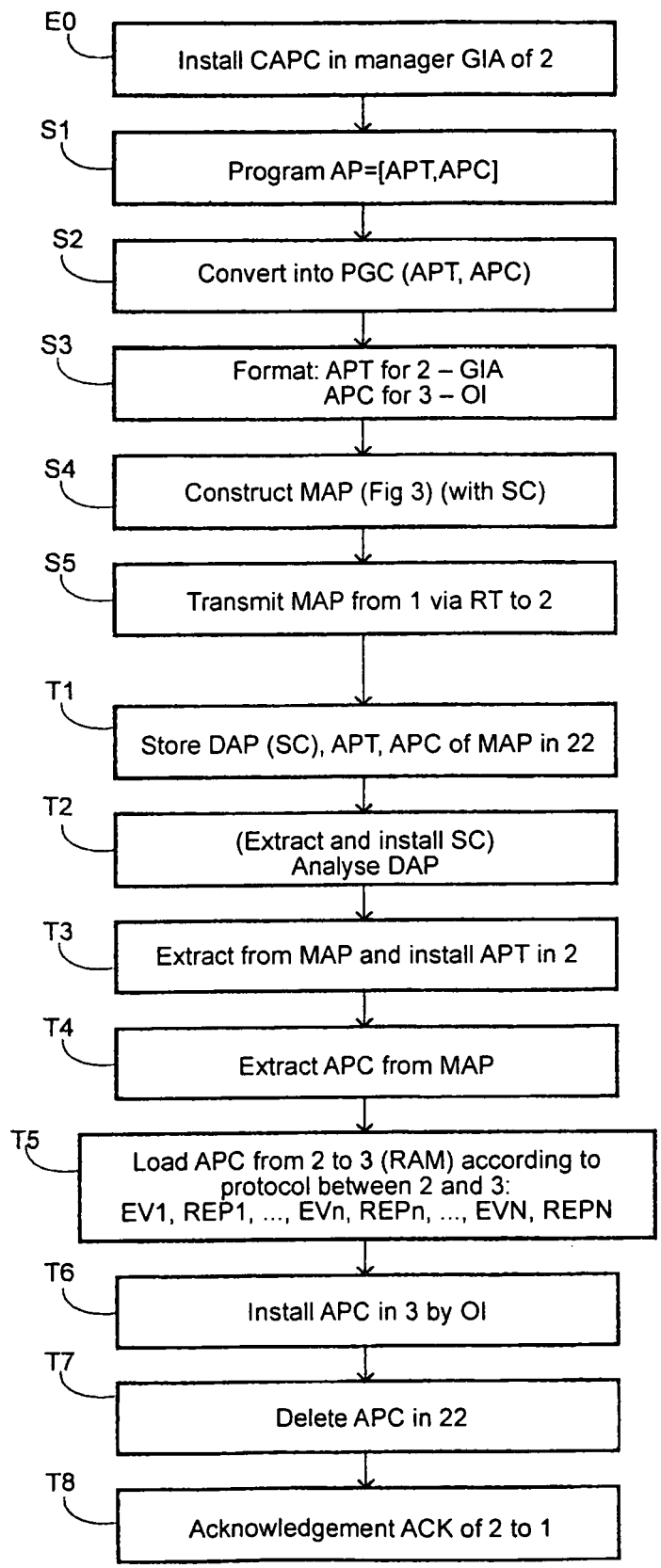
FIG. 4 is an algorithm of the two-part application loading method according to the invention.

Referring now to FIG. 4, the method of loading an application AP comprising a first part APT intended for the terminal 2 and a second part APC intended for the chip card 3 comprises essentially steps S1 to S5 executed in the server 1 and steps T1 to T8 executed principally in the terminal 2.

It is assumed that, at an initial step E0 preceding at the least the steps T1 to T8, the second application part loader CAPC according to the invention has been installed in the form of a software module in the memories 22, for example from a server other than the server 1.

At step S1, a developer of the application editor managing the server 1 writes the application AP in high-level source language so that it contains two parts APT and APC in Java and Java card languages respectively intended for the terminal 2 and chip card 3. The converter 11 converts the application AP=[APT, APC] into a compiled program PGC [API, APC] in intermediate language (pseudo-code). In a variant, steps S1 and S2 are performed outside the server 1 and the compiled program PGC is loaded in the server.

Then steps S3, S4 and S5 are respectively performed by the formatter 12, the constructor 13 and the loader 14. At step S3, the formatter 12 formats the compiled application part APT and APC so that they are respectively compatible with the installation manager GIA in the terminal 2 and the installation tool OI in the chip card 3. In particular, the second application part APC is segmented into protocol data units EV1 to EVN, as shown in FIG. 3, which are in accordance with the protocol for communication between the terminal 2 and the chip card 3 at the level of the connection between the reader 20 and the input/output port 35. Typically, the commands EV1 to EVN included in the part APC are formatted as short messages according to the GSM standard. At step S4, the constructor 13 adds a message header EN, an application descriptor DAP containing at least the second application part identifier IAPC and preceding the concatenated application parts APT and APC. The message MAP thus constructed contains a file of the JAR type including the fields DAP, APT and APC.

Figure 1:
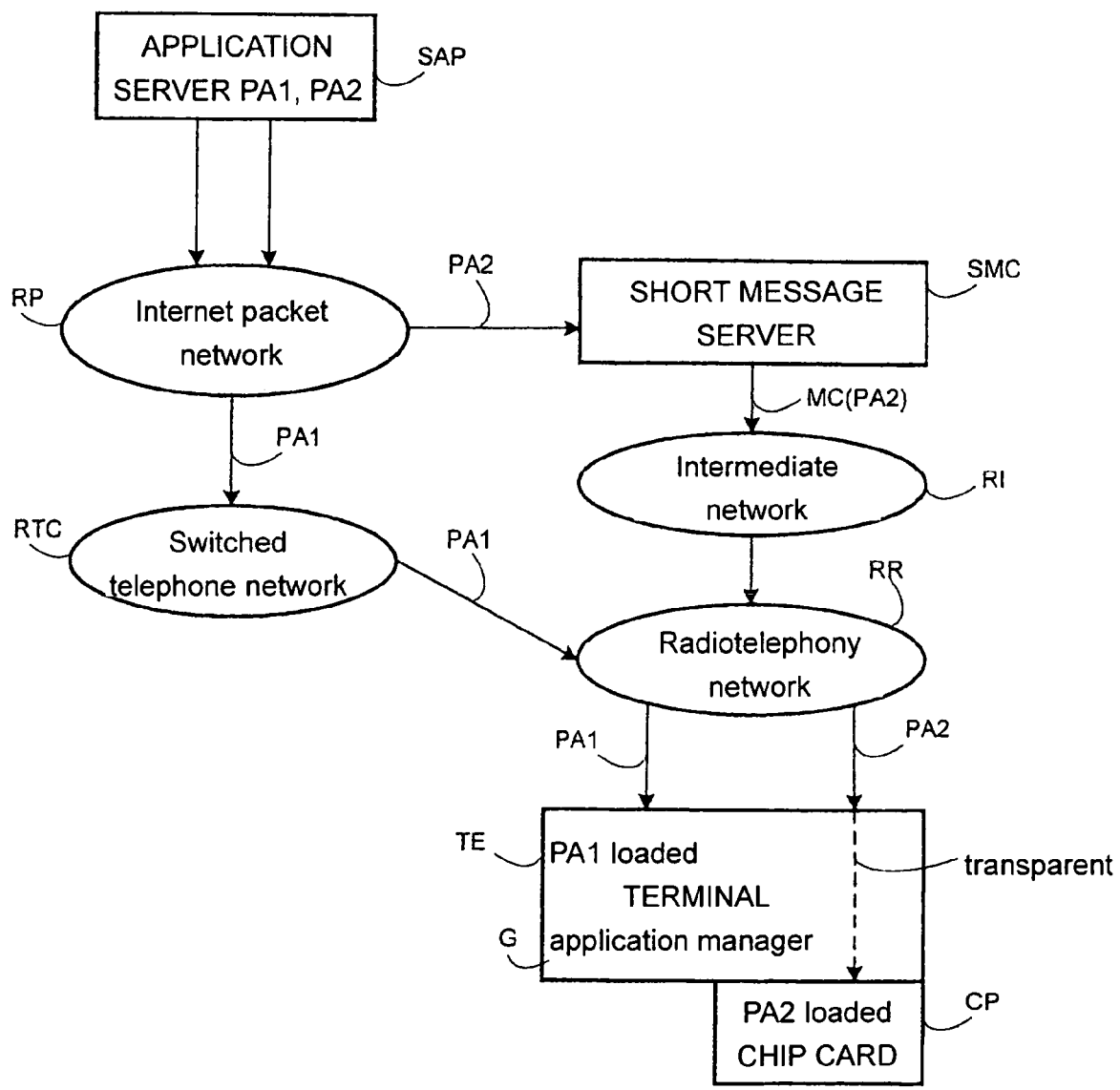

Then at step S5 the loader 14 transmits the constructed application message MAP to the terminal 2 through the telecommunications network RT, that is to say over a single transmission channel, rather than separately in two parts over two distinct desynchronised transmission paths RP-RTC-RR and RP-SMC-RI-RR according to the prior art shown in FIG. 1.

On reception of the message MAP in the terminal 2, the processor 22 demands the writing of the data DAP, APT, APC contained in the message MAP in the RAM memory of the memories 22, at step T1.

At step T2, the descriptor DAP extracted from the received message MAP and stored in the memories 22 is analysed in particular by the application installation manager GIA which is started up. By virtue of the analysis of the descriptor DAP, the application parts APT and APC are marked in the data field of the message MAP. First of all, at step T3 the installation manager GIA via the processor 21 reads the first application part APT and extracts it from the message MAP in the memories 22 in order to install it in particular in the non-volatile memory of these. The part APT thus installed can be executed by the virtual machine JVMT after the loading of the second part APC in the chip card 3. Naturally, if the part APT is empty, step T3 is not executed.

The manager GIA activates the loader CAPC, which extracts the second application part APC from the message MAP written in the memories 22, at step T4, ignoring the content of the part APC and particularly the content of the protocol data units EV1 to EVN. The loader CAPC marks the part APC in the message MAP by means of the identifier IAPC read in the application descriptor DAP analysed at step T2. The part APC was correctly formatted for the formatter 12 in order to be directly used in the chip card 3.

Then the loader CAPC initiates an exchange with the chip card 3 in order to load the second extracted application part APC from the memories 22 through the reader 20 and the input/output port 35 in the RAM memory 34 of the chip card 3. The second application part APC is segmented into commands EV1 to EVN so as to load them successively into the chip card 3, at step T5. For each "ENVELOPE" command EVn transmitted by the reader 20, with 1≦n≦N, the processor 31 in the chip card 3 connected to the installation tool OI returns a respective response REPn according to the predetermined protocol for command and response exchange between the reader 20 and the chip card 3. The response REPn is analysed by the loader CAPC. If the response REPn contains a positive acknowledgement, the loader CAPC continues the process of loading the second application part APC by transmitting the following EV (n+1), and so on. In the contrary case, the response REPn contains an error that the loader CAPC indicates to the installation manager GIA, which retransmits it in the form of an error message to the application server 1. The loading of the second application part as the transmission of commands EV1 to EVN progresses is completely transparent in the terminal 2, that is to say it gives rise to no corresponding message or waiting message display in the terminal 2. As the commands EV1 to EVN are transmitted, the installation tool OI progressively installs the second application part APC in the chip card 3 by transferring the envelopes EV1 to EVN from the RAM memory 34 to the EEPROM memory 34 at step T6.

Preferably, after reception of the last response REPN from the chip card 3 to the last command EVN, the loader CAPC deletes the second application part APC received with the message MAP in the memories 22 at step T7. Then the application installation manager GIA demands in the terminal 2 the transmission of an acknowledgement message ACK to the server 1 via the network RT as soon as the loader CAPC has finished the loading of the second application part APC in the chip card 3, that is to say after steps T5 and T6 and optionally step T7.

In a variant, instead of the second application part loader CAPC being installed in advance in the form of a software module in the terminal 2 by electronic means other than the application server 1, the software module including the loader CAPC is previously introduced in the message MAP by the constructor 13 in the form of a script SC, as indicated between parentheses in a field of the message MAP in FIG. 3 and at step S4 in FIG. 4. During the step S4 of constructing the message MAP, the constructor 13 adds the script SC after the descriptor DAP, which is modified accordingly. At step T2, the manager GIA extracts the script SC in the application message MAP received by the terminal 2 so as to install the script SC in the non-volatile memory of the memories 22. The script SC is then initiated by the manager GIA in order in particular to extract the second application part APC and to load it in the chip card 3 in steps T4 and T5.

According to another variant, the application message MAP does not contain the script SC. A script address URL (Uniform Resource Locator) designating a location in a server that has stored the script SC is introduced during the construction S4 of the application message MAP to be transmitted to the terminal 2. At step T2, the manager GIA in the terminal 2 extracts the script address from the message received and stored MAP and requires from the server designated by the extracted address the downloading of the script SC in the memories 22 of the terminal 2. The script SC is then initiated by the manager GIA in order in particular to extract the second application part APC and to load it in the chip card 3 at steps T4 and T5.

The invention claimed is:

1. A method for loading an application from a server, said application including a first part intended for a terminal provided with an application management means and a second part intended for a chip card accepted in the terminal, the method comprising the following steps:

supplying to the terminal a loading means for loading the second application part in the chip card;

formatting in the server the second application part so that it is compatible with a protocol for communication between the terminal and the chip card;

constructing in the server an application message containing the first application part and the second formatted application part;

transmitting the application message from the server to the terminal over a single transmission channel;

installing in the terminal the first application part extracted from the application message via the management means; and loading the second application part extracted from the application message from the terminal into the chip card according to the predetermined communication protocol under the control of the loading means.

2. A method according to claim 1, wherein the application message includes a descriptor of the application includes at least one identifier of the second application part, and the management means analyzes the descriptor in the application message received by the terminal so that the second application part is extracted from the application message according to the identifier in the analyzed descriptor.

3. A method according to claim 1, wherein the loading means is installed in advance in the form of a software module in the terminal.

4. A method according to claim 1, further comprising the steps of introducing the loading means in the form of a script during the construction of the application message to be transmitted from the server to the terminal and installing the loading means by extraction of the script in the application message received by the terminal before loading the second application part.

5. A method according to claim 1, further comprising the steps of introducing an address of a loading script during the construction of the application message to be transmitted from the server to the terminal, installing the loading means by extraction of the script address in the application message received by the terminal, and downloading the script from the extracted address in the terminal before loading the second application part.

6. A method according to claim 1, further comprising, after the step of loading the second application part the step of deleting the second application part in the terminal.

7. A method according to claim 1, further comprising, after the step of loading the second application part, the step of transmitting an acknowledgement message from the terminal to the server as soon as the management means has finished loading the second application in the chip card.

8. A method according to claim 1, wherein the second application part is segmented into protocol units which are in accordance with the communication protocol and which are loaded successively in the chip card under the control of the loading means, and further including the step of transmitting from the chip card an acknowledgement response after the loading of each protocol unit.

9. A method according to claim 1, wherein the first and second application parts are written in high-level languages and are converted into an intermediate language that can be interpreted respectively by virtual execution means respectively implemented in the terminal and the chip card.

10. A method according to claim 1, wherein the terminal is a mobile radiotelephone terminal.

* * * * *